United States Patent
Goldman et al.

(10) Patent No.: US 9,087,320 B2
(45) Date of Patent: Jul. 21, 2015

(54) SPORTS COLLABORATION AND COMMUNICATION PLATFORM

(75) Inventors: Steve Goldman, Mercer Island, WA (US); Bradley Hefta-Gaub, Seattle, WA (US); Grant Hegerberg, Seattle, WA (US); Tim Bauman, Mercer Island, WA (US)

(73) Assignee: Korrio, Inc., Seattle, WA (US)

( * ) Notice: Subject to any disclaimer, the term of this patent is extended or adjusted under 35 U.S.C. 154(b) by 391 days.

(21) Appl. No.: 12/883,026

(22) Filed: Sep. 15, 2010

(65) Prior Publication Data

US 2011/0066664 A1    Mar. 17, 2011

Related U.S. Application Data

(60) Provisional application No. 61/242,785, filed on Sep. 15, 2009.

(51) Int. Cl.
    G06F 17/30     (2006.01)
    G06Q 10/10    (2012.01)

(52) U.S. Cl.
    CPC ........ G06Q 10/10 (2013.01); *G06F 2221/2113* (2013.01)

(58) Field of Classification Search
    CPC ................. G06F 2221/2113; G06F 2221/2141
    USPC .......................................... 707/781, 783–786
    See application file for complete search history.

(56) References Cited

U.S. PATENT DOCUMENTS

| | | | |
|---|---|---|---|
| 2002/0177109 A1* | 11/2002 | Robinson et al. | 434/118 |
| 2007/0233569 A1* | 10/2007 | Kelley et al. | 705/14 |
| 2008/0052203 A1* | 2/2008 | Beyer et al. | 705/28 |

* cited by examiner

*Primary Examiner* — Thu-Nguyet Le
(74) *Attorney, Agent, or Firm* — Boswell IP Law; J. Mason Boswell (57) ABSTRACT

A sports management system is described herein that provides a platform and social network for those associated with youth and other sports to simplify common tasks, unify related participants, and enhance the activities surrounding playing sports. The system brings together players, parents, and coaches into an integrated experience centered on the information each is interested in. The system is not tied to any one sport, but rather can unify information from multiple sports, so families that have multiple children playing, for example, soccer, football, basketball, and baseball can follow information about their players and teams throughout the year. Thus, the sports management system provides a one-stop location for all parties related to youth and other sports to gather and share information.

20 Claims, 4 Drawing Sheets

SPORTS COLLABORATION AND COMMUNICATION PLATFORM

CROSS-REFERENCE TO RELATED APPLICATIONS

The present application claims the benefit of U.S. Provisional Patent Application No. 61/242,785 entitled "SPORTS COLLABORATION AND COMMUNICATION PLATFORM," and filed on Sep. 15, 2009, which is hereby incorporated by reference.

BACKGROUND

Sports and community have been intimately connected since the times of ancient Greece and the founding of the Olympic Games. Today, sports are deeply woven into the fabric of American culture and the impact on families is profound. 44 million children, ages 8 to 18, played organized youth sports in the United States in 2008. Sports are also big business. In aggregate, the amount of money spent annually on sports is enormous. Consumers spend $25 billion each year on retail sporting goods and another $26 billion on spectator sports, radio and television broadcast rights, merchandise, sponsorships, and online media rights. In 2007, the total U.S. sports market was $51 Billion, projected to grow at 5.8% compound annual growth rate (CAGR) through 2011 according to Price Waterhouse Coopers. The global sports market was over $100 Billion in 2007 projected to grow at 5.6% CAGR.

In addition to professional and college sports, youth sports are very popular and many people have some connection to youth sports, whether as a player, parent, or teacher/coach. Youth sports involve millions of children across the U.S. and many more in other countries. Schools, community centers, and other organizations often create leagues and other groups for particular ages, sports, and other demographics.

However, the market is very fragmented by sport, geography, participant age, and vendors. For example, web sites centered around a team do a poor job of connecting a particular child or player with other sports and teams with which the player may be associated. Similarly, although a particular child may have a Facebook or other personal web site, these sites do a poor job of focusing on the child's sports performance and do not necessarily connect the child with other team members, parents, coaches, and so forth. Moreover, when it comes to youth sports in the U.S., no one addresses the three groups that matter most: children, parents, and coaches, in a unified way. The experience for children, parents, and coaches participating in youth sports today is universal, yet largely unshared as a community given the market fragmentation. The goals of youth sports are consistent—children want to play and compete, parents want to watch their children play and develop new skills, and coaches want to teach the children and help them grow while making sports fun and exciting. At the same time, families are busier than ever before and very few of today's technology tools have been applied to help streamline, simplify, and integrate the youth sports experience.

DETAILED DESCRIPTION

A sports management system is described herein that provides a platform and social network for those associated with youth and other sports to simplify common tasks, unify related participants, and enhance the activities surrounding playing sports. The system brings together players, parents, and coaches into an integrated experience centered on the information each is interested in. For example, a player may be interested in information related to each of the teams the player is associated with, a parent may be interested in information about how each of his/her children are doing at various sports, and a coach may want to manage the performance of various players across potentially multiple sports and/or teams with which the coach is involved. The system is not tied to any one sport, but rather can unify information from multiple sports, so families that have multiple children playing, for example, soccer, football, basketball, and baseball can follow information about their players and teams throughout the year. Thus, the sports management system provides a one-stop location for all parties related to youth and other sports to gather and share information.

The system provides a data model that treats each accessor of the system as an object. Each object can have one or more roles and one or more relationships to other objects. For example, an object may include a particular person, who may have the role of player on multiple teams. Resources, such as schools or fields, may also be objects with corresponding roles. A parent could have multiple students playing different sports, and thus could be represented by an object with multiple parent roles and relationships to each of the players. The data model allows the system to specify security around roles and relationships. For example, the system can grant access to a website with team information to the coach, players, and parents of players. In addition, the system can support different views of the same website for each of these roles as well as a public or guest role that may omit sensitive information (such as player names and/or ages). A parent viewing his/her child's web page may see different information than other users of the system viewing the same page. Roles can be set up manually or automatically, such as by a coach adding players to a team roster and by allowing parents to claim their children (e.g., through an invite and mutual acceptance with the child). Roles and relationships also feed event changes provided by the system. For example, notification of rescheduling of a game entered by a coach may produce notifications (e.g., an email or text message) to players and parents of players associated with that game.

Figure 1:
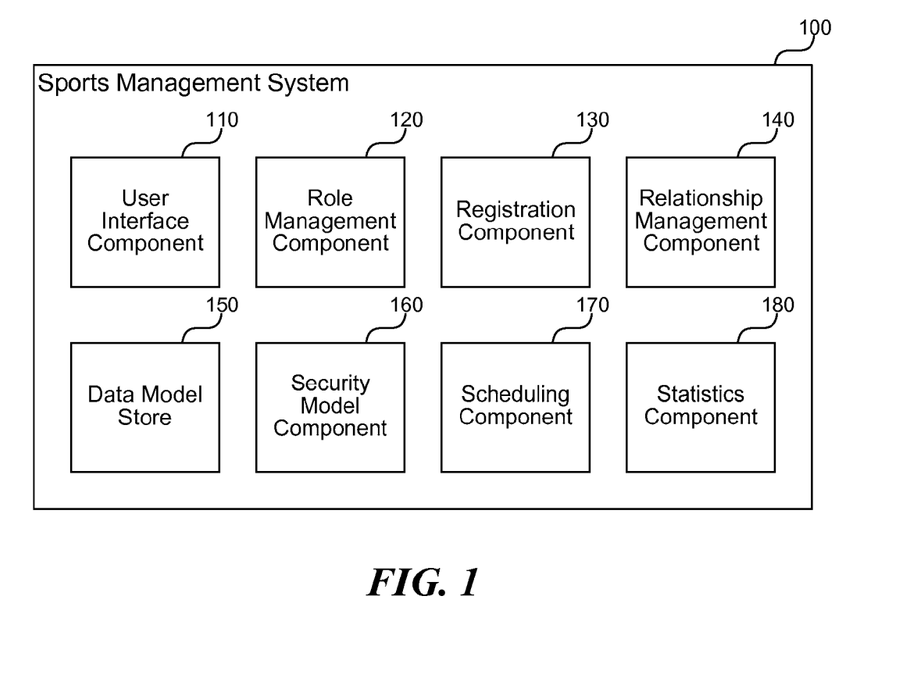
FIG. 1 is a block diagram that illustrates components of the sports management system, in one embodiment.

FIG. 1 is a block diagram that illustrates components of the sports management system, in one embodiment. The system 100 includes a user interface component 110, role management component 120, registration component 130, relationship management component 140, data model store 150, security model component 160, scheduling component 170, and statistics component 180. Each of these components is described in further detail herein.

The user interface component 110 provides one or more user interfaces through which users access the system. The user interface component may provide one or more web pages, web sites, mobile applications, desktop applications, programmatic application programming interfaces (APIs), and so on through which users can access the system. As detailed herein, the user interfaces to which the system grants a user access may depend on the user's role(s) and/or relationship with an object or user interface the user is attempting to access.

The role management component 120 manages one or more user roles that describe a user's rights and responsibilities for using the system. A role may include actor types, such as coach, parent, player, as well as finer divisions within each of these, such as first baseman or head coach. In addition, roles may describe a user's capacity to perform certain actions. For example, one player on a team may be designated with a role for ordering team uniforms or other equipment. As illustrated by this example, a particular user may have multiple and even many roles at the same time. A user's roles within one team may differ from a user's role or roles on another team. The system uses user roles to determine actions that a user can perform with respect to system objects (e.g., user interfaces and administrative functions). In some embodiments, the system provides objects for non-user resources associated with the system. For example, the system may allow objects to be created representing fields on which games are played (e.g., for scheduling use of the field), cars available for carpooling, schools with which players are associated, and so forth.

The registration component 130 receives user information and associates one or more user roles with a user. The registration component may include a user interface through which the user provides sign-up information, such as a user name, password, contact information, notification preferences, teams or organizations with which the user is associated, and so forth. The registration component 130 may allow users to visit a main system website and sign up with the system on their own, or may provide an invitation paradigm. For example, a coach may create a team using the system and add each player to the roster. As a result, the system may send an email with a link to sign up to each added player. The registration component 130 handles adding new users and managing roles to the system 100 and stores information about each user in the data model store 150.

The relationship management component 140 manages relationships between users and other system objects. For example, each player on a team is in a player relationship with the team object. A user may have many relationships with other objects in the system at the same time. For example, a user may be a player on one team and a coach on another. While roles specify the types of positions that a user holds, relationships specify the particular objects related to those positions. For example, while a user may have a role of "parent" associated with their user record, the user has a relationship record that specifies the user's particular child (e.g., Joe Smith). The relationship management component 140 handles the formation and expiration of relationship records as user interactions with other users and objects change.

The data model store 150 stores records for each of the objects, roles, and relationships associated with the system. The data model store 150 may include one or more files, file systems, hard drives, storage area networks (SANs), databases, cloud-based storage services, or other storage facilities for persisting user data and other system data. The data model store 150 provides a persistent record for each system object and creates associations that represent user roles and relationships. For example, the data model store 150 may be implemented in a database that contains a table of users, a table of user roles, a table of user-to-user relationships, a table of teams, and so forth. Those of ordinary skill in the art will recognize numerous ways of storing data to persist the types of data objects described herein.

The security model component 160 manages access to objects based on roles and relationships. For example, each time a user requests access to a particular user interface provided by the system 100, the security model component 160 may determine what information the user can access and what to display in the user interface. As an example, a user accessing a team home page may see general information about the team or a detailed team roster and player statistics depending on whether the user is a player on the team or has no direct relationship with the team. A user with a role of parent and a relationship with a child on the team may see information about their child (or children if more than one child is on the team) but not information about other players. The coach or other administrator may determine which information each user associated with a team can access. The role-based data model provides a flexible and easy to manage security model. The security model component 160 can quickly determine access rights based on user roles and relationships.

The scheduling component 170 manages event schedules and notifications. Events may include game dates/times, practice sessions, try-outs, award ceremonies, and any other event associated with a sports team or other system objects. The scheduling component 170 stores information about each event and manages functions such as rescheduling events and scheduling resources needed for the event (e.g., a particular field). The scheduling component 170 may also provide notifications such as reminders about the event to the team, sending a map and/or directions just before the event, and sending cancellation/rescheduling notifications when a time or location for an event changes. The scheduling component 170 may provide a user interface for coaches or other users to enter and/or modify information about events. The system may also manage associated events. For example, a parent may indicate that they will leave for a game at a particular time and provide room in their car for a certain number of players. The parent's departure can be an event and the car can be a resource that other team members can view and indicate an interest in, for example, carpooling.

The statistics component 180 manages player and team performance information. The system 100 may store scores during and after each game, send notifications to users associated with a team about a game outcome, allow players or other users to view historical statistical performance, and so forth. The statistics component 180 manages the storage, analysis, and access of statistical information related to sports teams managed by the system. The component 180 may provide one or more data analysis components, so that a player, coach, or parent can review a player's scoring record or other performance information. The component 180 may also provide tools for a coach to review team performance, standing within a league, rank in a playoff, and so forth.

The computing device on which the sports management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
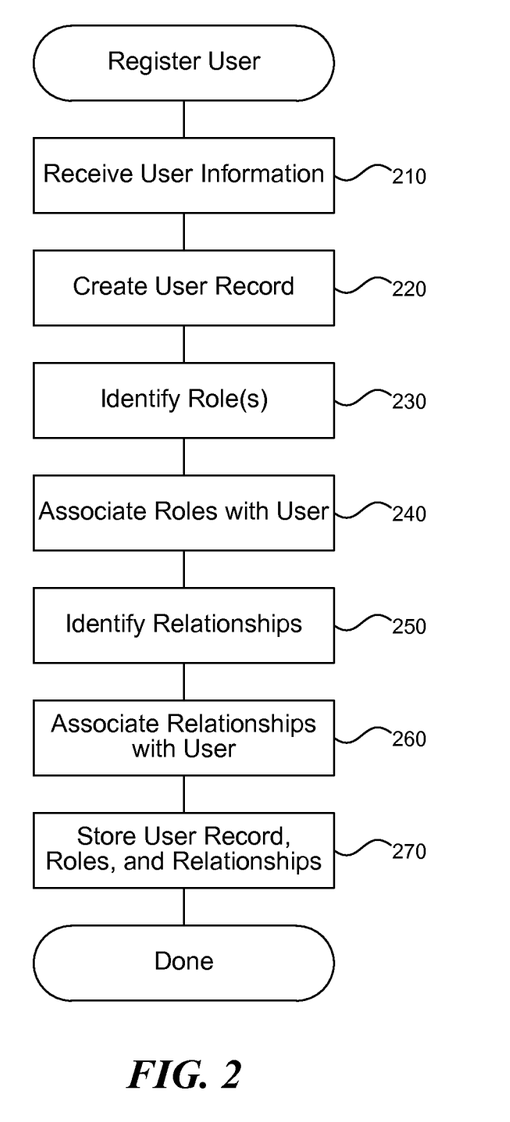
FIG. 2 is a flow diagram that illustrates processing of the sports management system to register a user of the system, in one embodiment.

FIG. 2 is a flow diagram that illustrates processing of the sports management system to register a user of the system, in one embodiment. Beginning in block 210, the system receives information about a user registering to use a sports management platform. For example, the user may visit a web page provided by the system and request to sign up to use the system or may click on an invitation link in an email or other message. The received information may include an email address, username, contact information, or other information about the user requested by the system. Continuing in block 220, the system creates a user record that establishes an object managed by the platform for representing the user. For example, the system may create a row in a database table that stores information about the user.

Continuing in block 230, the system identifies one or more roles to associate with the created user record, wherein each role corresponds to one or more rights of the user for using the platform. The user may specify roles manually or the system may infer one or more roles based on sign up information (such as information provided in an invitation to the user). For example, a coach may send sign up invitations to each player on a team and the system may associate a player role with each invited player when the player registers with the system. Other users, such as parents, may identify their roles by identifying one or more children of which they are the parents. The system may provide a subsequent confirmation process for confirming roles, such as sending an email to the coach to confirm added players.

Continuing in block 240, the system associates the identified roles with the user record. For example, the system may create a row for the user role in a database table or store a list of user roles in association with the user record. Multiple users may have the same role (e.g., player) and a single user may be associated with many roles (e.g., parent and player). The system allows a flexible association of users with many roles.

Continuing in block 250, the system identifies one or more relationships associated with the identified user roles, wherein each relationship specifies another system object with which the user is related. For example, a user that is a youth sports player may have a relationship with that player's parent. A parent may have relationships with each of their children. Coaches and children may have relationships with each of their teams, and so forth. The system may identify relationships automatically, such as by matching the user's name to one or more team rosters, or manually by asking the user to identify relationships with other users.

Continuing in block 260, the system associates the identified relationships with the user record. For example, the system may create a row for the relationship in a relationship table. Relationships create links between objects managed by the system. For example, a parent-child relationship creates a link between the parent's user record and the child's user record.

Continuing in block 270, the system stores the created user record, identified roles, and identified relationships in a data store. The system may perform the preceding steps within a database transaction or using other storage models for ensuring consistent stored data. The system stores the user information so that when the user logs in and attempts to access portions of the system in the future, the system can identify the user and determine the user's access rights. Information provided by the user may be made available to other users, such as an email address for the coach to use to contact a player. After block 270, these steps conclude.

Figure 3:
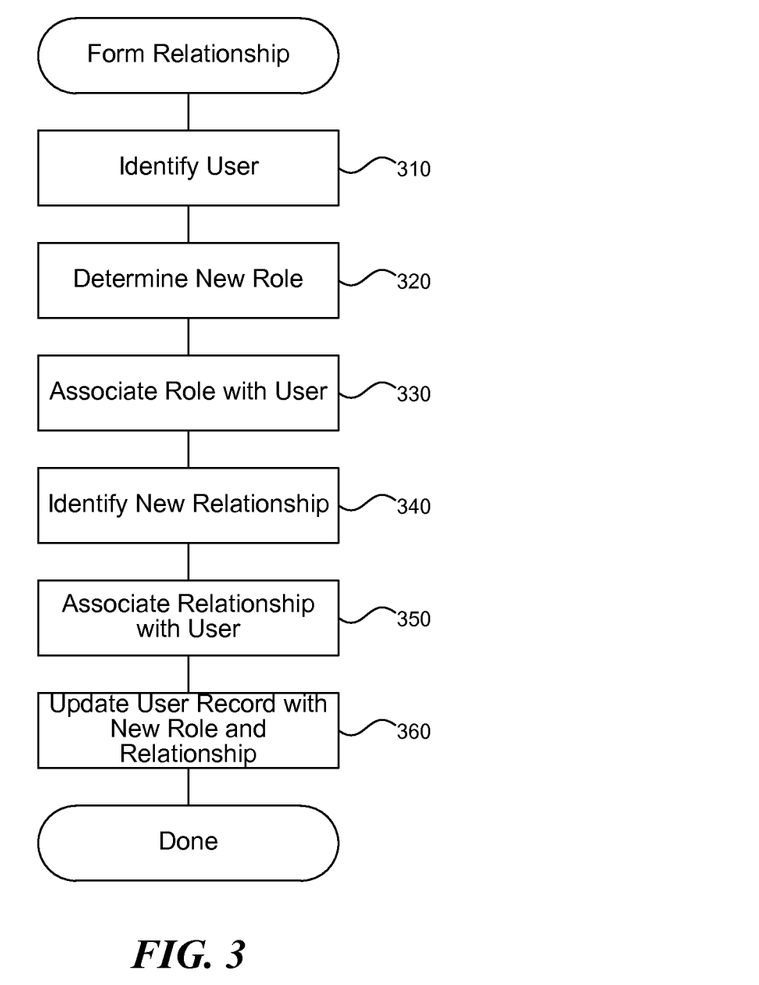
FIG. 3 is a flow diagram that illustrates processing of the sports management system to form a new relationship, in one embodiment.

FIG. 3 is a flow diagram that illustrates processing of the sports management system to form a new relationship, in one embodiment. Although some relationships may be formed during user registration (see, e.g., FIG. 2), users of the system will form new relationships over time. For example, parents may have younger children that start playing sports, children may join new teams, coaches may come and go between teams, and so forth. The following steps describe the process of forming a new relationship when the user is already registered with the system. Beginning in block 310, the system identifies a user with which a new role and relationship is to be associated. For example, the user may have joined a new team as a player or coach. The system may identify the user based on a profile associated with a logged in user or other information provided by the user, such as a previously created invitation code associated with the new relationship.

Continuing in block 320, the system determines the new role to be associated with the user. For example, if the user is joining a new team, then the system may associate a player role with the user. The role grants the user access to various user interfaces and information managed by the system. For example, a player can view team information that is not accessible to someone not affiliated with the team. Continuing in block 330, the system associates the role with a stored record associated with the user. For example, the system may add a row in a database table that identifies the new role or modify the user's record to indicate the new role.

Continuing in block 340, the system identifies the new relationship to be associated with the user. In some cases, the role and relationship are closely related. For example, when adding a parent role to a user the relationship may identify the particular child of which the user is the parent. A user may have a single role that generates multiple relationships. For example, a user may have a role of parent and then a corresponding relationship with multiple children of which the user is the parent. Roles and relationships determine what information the user can access. For example, by virtue of the parent role, a user may be able to view a parents' page, and by virtue of a parent relationship to a particular child, the user may be able to view detailed information about that child. Continuing in block 350, the system associates the identified relationship with the stored record associated with the user. Like the role information, relationships may be stored as relational database information, hierarchical information (e.g., in an XML file), or in another storage facility that allows persisting and accessing the data.

Continuing in block 360, the system updates the stored record to include the associated role and relationship. For example, whereas the previous steps may have created the new associations in memory the updating step may persist those updates to a storage device or finalize a pending database transaction opened by the previous steps. After block 360, these steps conclude.

Figure 4:
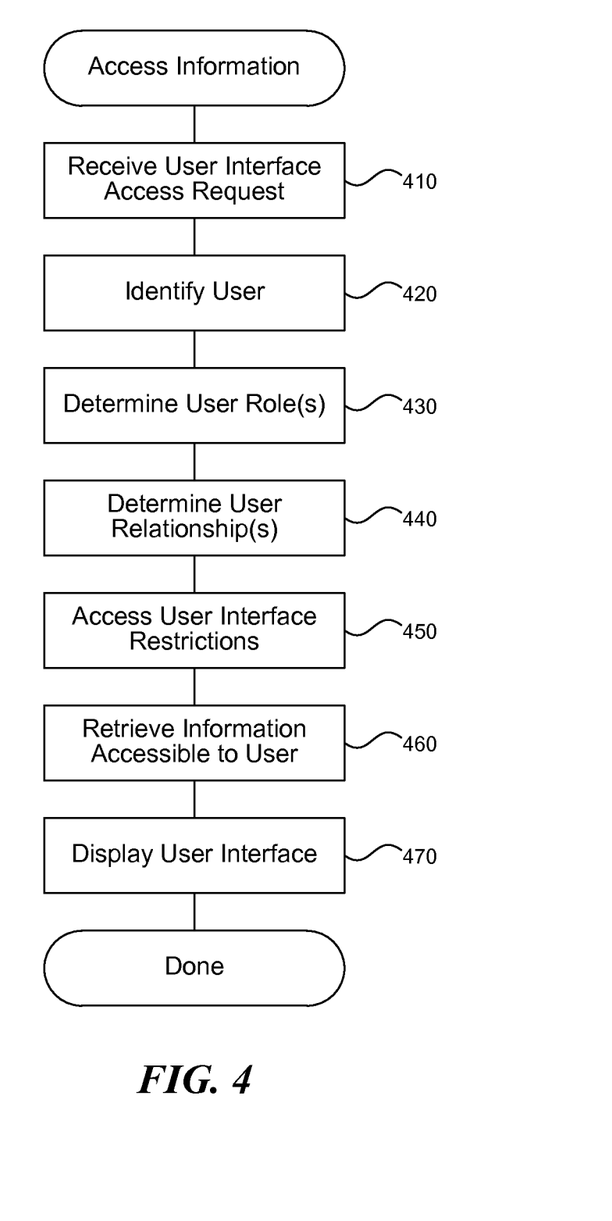
FIG. 4 is a flow diagram that illustrates processing of the sports management system to provide a user access to an information page, in one embodiment.

FIG. 4 is a flow diagram that illustrates processing of the sports management system to provide a user access to an information page, in one embodiment. Information pages may include any user interface presented by the system, such as a team web page, player web page, parent view of their children's information, user home page, leaderboard page, and so forth. The system distinguishes the information that a particular requesting user can access based on that user's roles and relationships, as described by the following steps.

Beginning in block 410, the system receives a request to access a user interface that displays information about one or more sports-related items. For example, a user may visit a web page that displays information about a team and request roster or other information. Continuing in block 420, the system identifies a user associated with the request. For example, the user may have previously logged into a profile or the system may request that the user log in after receiving the request. The system may access a stored record associated with the user that identifies additional information about the user.

Continuing in block 430, the system determines one or more user roles associated with the user, wherein a role identifies information that the identified user can access. For example, if the user is accessing a resource that is only for players and the user is not part of the player role, then the system may deny the request or show the user a limited view of the user interface that does not contain private or sensitive information. Continuing in block 440, the system determines one or more user relationships associated with the requested user interface. For example, if the user interface contains information about a particular child registered with the system, then the system may determine if the requesting user has any relationships with the child that would permit access to the information.

Continuing in block 450, the system accesses information describing one or more users, roles, or relationships to which the requested user interface is restricted. For example, the system may access stored information associated with a web page for viewing team information that identifies the users that can view the team information. The access information may be specified by role or relationship so that as the people that fill those roles and relationships change, the access changes. For example, the system may specify that a coach can view the team page, and today the coach may be identified as a particular user that may change in the future.

Continuing in block 460, the system retrieves information associated with the requested user interface that is accessible to the identified user based on the user's roles and relationships. The page may display different amounts or types of information to different users depending on the determined roles and relationships. For example, a parent of a child may see more information when viewing a web page associated with the child than when members of other teams view the page. Continuing in block 470, the system displays the requested user interface including the information accessible to the identified user. After block 470, these steps conclude.

Registration

The sports management system provides the ability for participants (and in some cases their parents or guardians) to easily register for a sports season. In some embodiments, this registration can be greatly simplified through a concept called "one click registration." One-click registration allows a parent, guardian, athlete, or other representative of an athlete to create a profile for the athlete. The system enables the representative to use the created profile to easily register the athlete for multiple sports with any league system without re-entering redundant data each time. The profile may include demographic data about the athlete used to register for a season (e.g., gender, age, and experience). The profile may also contain representations of requested physical documentation like a scanned birth certificate, standardized liability waiver, concussion and head trauma waiver and awareness form, and any other common forms.

In some embodiments, the system integrates with a social structure database to prompt the user with auto-complete/auto-identify answers. For example if the user who is performing the registration is known in the social structure as a parent of a single child, then the system can predict that the registration is for that child athlete, and automatically recommend answers to common registration questions. If the representative is the parent of multiple child athletes the system can ask which athlete is being currently registered, and once that detail is known the remaining registration questions can be automatically answered.

In some embodiments, the system is able to handle multiple registrations for a single athlete across multiple sports or multiple seasons in order to avoid repetitive data entry. In some embodiments, a sports league may have multiple age brackets, and the system is able to recommend new age brackets and teams based on the new age of the athlete. In cases where the athlete has a history of participating in multiple sports, the system will determine which sport is appropriate based on other factors like season, availability of team slots, or registration opening timelines.

In some embodiments, handling of the collection of fees associated with registration is a component of the registration process. Organizations providing the team and league want to have assurance that the registration fees collected on their behalf are secure and will end up in the appropriate bank account. There have been cases of unscrupulous service operators who have collected fees and failed to disperse them to the rightful account holder. In order to address this concern, some embodiments will explicitly remove themselves as an intermediary, and instead facilitate the direct payment of the fees to the appropriate account. Some embodiments achieve this through allowing final payees to enter independent payment routing information, where fees are directly sent to a bank account.

Service fees associated with the registration and sports community platform are billed out-of-band and therefore are independent of the actual fee registration process. Other embodiments may collect the entire registration fee in the account of the sports community service provider and transfer funds to the final payee's account. Other embodiments may include collection of the entire registration amount, then an immediate transfer of the fees due to the final payee into an independent escrowed account for a period short enough to validate that the transaction will not be reversed, and then upon expiration of that cancellation period the funds are transferred to the final payee's account. Some embodiments of the system integrate directly with bank entity credit card payment systems, while other embodiments work with large-scale processing providers like PayPal, Google, or Amazon. Some embodiments allow users to store credit card details for one or more transactions and allow users to reuse the stored credit card details for future transactions.

Because some sports organizations are regulated under state, federal, or municipal guidelines and programs, it is useful for league administrators to be presented with demographic data about the overall population of their participants. Some embodiments of the registration system gather this demographic data for these state, federal, and municipal reports to facilitate grants, financial support, or regulatory compliance.

In addition to implementing the registration process, the system can also present the registration status in an easy to use format for team and league managers. In some embodiments, the system provides a dashboard for team managers, coaches, and league officials that shows team/player registration and the completion of other steps in the team formation process. Some embodiments include a report of which users have purchased their mandatory or optional equipment like uniforms, balls, sticks, and other gear. Some embodiments include a report of completion of various waivers, health checks, physicals, insurance payments, or other additional aspects of the registration process. Some embodiments include reminders and alarms that notify the coach, team manager, or league representative of the completion and compliance status of their team members' registration process.

Many organizations allow a registration process that takes several steps. For example, some organizations allow individuals to reserve a slot on a team before the completion of payment, or before collection of waivers and physical reviews. Some embodiments include a presentation to the athlete and representatives of the athlete (parents, guardians, etc.) of the status of the athlete's registration process. Some embodiments include reminders and alarms that notify the athlete or their representatives of the completion and compliance status of the athlete's registration.

Rosters

The sports management system provides construction and management of a team and league roster of athletes, coaches, fans, friends and family members associated with a team. Some embodiments implement a roster of just athletes. Some embodiments implement support for coaches and team managers as roster slots in addition to athlete slots. One embodiment allows the definition of users in the system independent of their particular association with a team or team roster position. One embodiment allows users to have roles within teams. Some embodiments allow users to have multiple roles, for example, they could be a parent of another athlete on one team, while being an athlete themselves on another team.

Some embodiments allow for the entry and management of roster positions through an authorized team manager or coach's dashboard. Such a dashboard may allow the addition of athletes to the team and assignment of athletes to particular positions.

Some embodiments allow less structured construction of a team roster, such as in a situation where multiple athletes have joined the sports community independent of the team with which they are affiliated. In those cases, some embodiments may allow for a grass roots or democratic process for filling out and populating the team roster. Some embodiments may only allow a top down construction from the league and coach's view, while some embodiments may allow a combination of both.

Some embodiments allow the construction of a roster utilizing a graphical interface with avatars, icons, or images representing the athletes, allowing the coach or team manager to easily drag-and-drop athletes into different roster slots. Some embodiments may include graphical representations of the playing field to allow a more direct tactile manipulation of athletes in their particular roster roles. Some embodiments of this process work in real time and integrate with the system's ability to track game statistics live. Some embodiments integrate with aspects of the system that replay the game and or display the real time status of the game (for example features described in the "Be There Live" feature description herein).

Some embodiments include support for coaches' tools for manipulation of line up during the process of a game. Some embodiments are designed to implement fair playing time algorithms to ensure that coaches know how much playing time each athlete is getting and therefore when and how to rotate out athletes during a game. Some embodiments may include rotation algorithms that use a number of strategies to produce satisfactory playing time results. Algorithms may include: random and pseudo-random shuffles; allocation of players to offensive and defensive roles; division of players in various playing classes: starter, back up, first string, second string, and so forth; division of players based on experience: senior, junior, years of experience; division of players by position and experience level at different positions; allocation and rotation of players based on number of plays, touches, or other statistical metrics for participation; allocation of players based on sportsmanship, fan votes, player votes on or off the team; and so on.

Some embodiments may take into account sport-specific metrics. For example, in baseball or softball, the number of pitches thrown may be a required metric for determining if a pitcher can continue to play. Some embodiments allow the analysis of these metrics (e.g., pitch count) before a game in order to assist the coaching staff in developing a potential substitution list for use during a game. Some embodiments may implement real time support for tracking relevant statistics (e.g., pitch count) during a game and notifying the coach with a real time notification that, for example, a substitution is in order. Some embodiments of the real time support of the system include a stopwatch or game clock that displays in either countdown or count-up mode. Some embodiments may alert the coaching staff when it is appropriate to provide food and/or water to the athletes during a game.

Some embodiments of a roster implement support for a "document locker" that includes the collection of completed forms and waivers (e.g., release form, emergency contact, and so on) for team members. Some embodiments of the roster include a directory of biometric details for athletes, including but not limited to height, weight, allergies, dietary needs, recent fitness test results, and so forth. Some embodiments of a roster management system integrate with other aspects of the system like the registration system and uniform ordering system.

Relationship Management

In order to implement many of the features described here, the system may implement a data structure that allows the storage of athlete profile data and relationships to other athletes, teams, and users in a manner that is independent of the traditional team structure. Some embodiments of a sports community implement data structures and database design centered on the team, where athletes are associated with team roster slots. Some embodiments may allow an athlete to be linked to or associated with multiple team roster slots. One embodiment allows users to be associated with their roles on a team based on their relationship. For example, in one embodiment a user may be able to be an athlete on one team, a coach on another team, and a parent or fan of a different athlete.

In some embodiments, the athlete is removed from the context of the roster slot, and the parent/contact data, and is allowed to have multiple independent associations with other fans and/or roster slots. Features and applications that specifically benefit from this architecture include those applications that leverage the social network elements of the youth sports experience, e.g. never forget a face, contact, fantasy league play, scheduling, carpool, and so forth.

In some embodiments, it is possible for a parent to have multiple children in two teams in the same league. In some embodiments, the system is able to optimize storage and management of parent/family specific data that is the same for both athletes, e.g. contact, photos, insurance, waivers, and so on. Features and applications that are improved by this structure may include: never forget a face, carpool, registration, contact management, uniform purchasing, and so forth.

In some embodiments, it is possible for the athlete to be on multiple teams. In some embodiments, these multiple roster slots might exist because the athlete is in a second season, or because the athlete plays multiple sports. In some embodiments, the system is able to optimize athlete relationships across multiple sports and time. Applications that are improved by this structure may include: never forget a face, carpool, registration, contact management, uniform purchasing, and so on. In some embodiments, the system is able to leverage existing relationships about the athlete as the athlete joins new teams.

In some embodiments, what would traditionally be handled with a simple single table (or even a normalized multi-table simplified view) is enhanced by the ability for the Parent-to-Athlete relationship to be decoupled from the team roster relationship. In some embodiments, more complex examples that are more typical in today's environment are handled in an optimized manner. In some embodiments, the system is able to optimize cases where some families might have multiple athletes on the same team. In some embodiments, the system is able to optimize cases where some athletes have multiple fans. In some embodiments, the system is able to optimize cases where family organizations are more complex, with multiple kids from multiple different parents. Traditional systems fail to gracefully handle these nuances. In some embodiments, the system is able to optimize these more complex cases.

A very common situation in youth sports is the example of an athlete that stays in a program, playing on multiple teams in multiple seasons. Despite the fact that many kids remain within the same league organization, some embodiments of the database implementing a traditional registration process require parents to reenter existing data as if the athlete was new to the league program. One embodiment of the data structure eliminates the need to reenter data about the parent and athlete, and in fact can facilitate the selection of the appropriate team and roster slot. For example, In some embodiments, because the athlete participated in last season's program, the system can recommend the next appropriate team for registration. In some embodiments, static attributes like contact info and relationships are automatically maintained.

In some embodiments, parents and fans are stored as if they are different types of objects in the data structure. In some embodiments, parents and fans are implemented as the same object in the data structure. In some embodiments parents and fans are implemented as the same object type with a parameter that indicates what sub type they are. In some embodiments, these fan/parent object types have an attribute that indicates "approval authority" for waivers and travel permission. In some embodiments, some parents might not have "approval authority" in cases of split families, for example. One embodiment implements fans and parents as the same type of object with the object having an attribute that indicates the instance's "approval authority."

In some embodiments, non-athlete participants (fans, parents, coaches, team managers, and so on) are treated as the same type of object. In some embodiments, users (including athletes) are of the same object type (user) and whether or not a user is an athlete, parent, sibling, coach, or otherwise is dictated by the relationships with other users and other objects. One embodiment does not distinguish between user types (e.g., those who are "fans" or "parents" and users who are "athletes"). Instead, the system may allow all users to be any type, and use the relationships to other object types as the distinguishing factor. In some embodiments, there is no association between the parent and child. In some embodiments, each object (parent and athlete) is a user and a relationship is added between these user objects.

In some embodiments parents (or coach, or other non-athletes) are listed as just another team member with a roster slot of "Parent." Alternatively or additionally, embodiments may eliminate the need to add parents to team rosters.

One element related to scaling the system is the ability to share the database across the population. Some embodiments take the approach of having a single user type and share the database across user identifiers. Some embodiments use tables that store the relationships of a user to all other objects in a single share.

Scheduling

The sports management system provides the ability to schedule league game schedules. League management extends beyond just roster management to include a directory of teams. Some embodiments name the teams that define the league, then determine practice schedules, then determine game schedules, which then drive field scheduling and ownership. Some embodiments handle each of these steps separately to allow integration with data from external platforms. For example, field scheduling might be a service provided by an external system that has the ability to export and import team and game scheduling information.

Some embodiments implement support for season and tournament scheduling in various formats. Examples of tournament scheduling algorithms include but are not limited to: round robin, single or double elimination, or more complicated tiebreaker implementations. Some embodiments may implement support for "plug-in" modules for implementing additional scheduling algorithms.

Some embodiments may implement support for mid-season or post-season "all-star games" in which the league leaders based on particular position-appropriate statistics are calculated and included on an all-star roster. Some embodiments may provide support for election of all stars by their peers, coaches, or fans. Some embodiments may utilize a combination of statistical metrics as well as subjective metrics (e.g., votes) to determine the all-star roster slots.

Some embodiments may implement support for resolving contention between multiple sports for the same fields. Some embodiments are aware of difference in game length and typical playing and setup time to assess the likelihood of conflict for a particular scarce resource. Some embodiments allow the implementation of a rules-based hierarchy of sports, teams, or team classifications to resolve contention for fields. Some embodiments track a history of field assignments and utilize this historical information in the implementation of the field scheduling (e.g., to apply fairness where one team has held the field more frequently than others have).

Some embodiments present the field schedules in a variety of formats (e.g., list form, calendar form, or bracket form). Some embodiments may support the filtering of schedule data based on sport, season, league, division, gender, team age bracket, or other team distinctions. Some embodiments may integrate with external calendar software packages like Microsoft Outlook, Google Calendar, and Apple's iCal.

Statistics

The sports management system provides the ability to collect statistics about athlete performance during a game. As statistics are collected, they can be presented in a number of formats either associated with the individual athletes or rolled up as part of team statistics. Some embodiments of the system allow statistics to be presented on a per game, per season, or career basis. Some embodiments allow statistics to be filter or categorized based on game context like field location, home or visitor status, day or night, weather, month, day of week, in-game situations, and so on. Some embodiments allow for the collection of statistics in real time. Some embodiments allow for the collection of data post game. Some embodiments allow for the collection of statistics during or after the game. Some embodiments allow the collection of detailed events like passes, foul balls, hits, strikes, balls, touches, tackles, and so forth.

Since some statistics are often specific to different sports, some embodiments only implement support for general statistics while other embodiments implement support for statistics specific to the sport.

Some embodiments include recording of the event, time of event, participants, and result of the event. Some embodiments utilize a stream parser, interpreter, or compiler to analyze a stream of events to calculate the actual statistics in real time or after the fact. Some embodiments utilize sport-specific compilers to implement sport-specific summaries based on a common generic event stream format.

Some embodiments of the statistics collection mechanism of the system may appear on a personal computer (PC) screen, while some embodiments may utilize a mobile device. One embodiment utilizes a mobile device with a simple user interface that allows rapid input of data. Some embodiments may use user interface tools like rollers or drop down lists to identify each player and a player's action.

Some embodiments may use gestures to interact with the user interface. For example, the user interface may include a graphical representation of the playing field with players on the field. When a player is clicked and a drag gesture is made across the screen to another player's icon, the system interprets that as a pass between the two players and registers that the event has occurred. In some embodiments, as soon as the event occurs it is passed into a sport specific compiler to calculate the current running statistics. Some embodiments may utilize voice recognition to record statistics, where a coach, team manager, or statistician simply speaks into a recording microphone on the mobile device. That recorded voice is processed by a speech-to-text system, and then the resulting text is passed into the sport-specific statistics compiler.

Some embodiments may integrate these statistics with other aspects of the sports community, including but not limited to integration with overall statistics, live event replay systems like those describe herein in association with "Be There Live," as well as roster management systems like the one described herein.

One feature of a sport community is the ability to post game results after the completion of the event. Game results include not only whether the team won or lost but also the score and a running record of game segment information. The level of statistical detail may vary by sport. For example, in a baseball game it is desirable to know runs, hits, and errors by team for each half of an inning and for all innings in the game. In addition, individual performance statistics, such as innings played, the number of times the player was at bat, results of their at bat performance along with defensive field performance including outs made, errors, and so forth are all relevant components of game statistics.

In some embodiments, a PC is used to record the results of the game to a centralized database for integration into web-based reporting applications. In some embodiments, the use of a mobile device utilizing the "Stats Collection" application described herein, records game statistics in real time and eliminates the need to input game data after the event.

In some embodiments, game results are presented in a hierarchical format whereby team results are presented as the initial level of information. The interested party then has the option to drill down to individual performance statistics based on the entire game. In some embodiments, clicking on the individual player provides additional performance statistics based on game segment for a complete statistical view of the event. For example, drilling down on the statistics of a soccer game may first show the result of the game and provide a roster list of the athletes who participated in the game. Game results include shots on goal, goals, and so on based on team and on half. Individual statistics can include minutes played, shots on goal, goals, assists, takeaways, and so forth.

In some embodiments, game results are incorporated into overall league standings. League standings can be based on individual team win/loss percentage compared to all other teams within their league. These standings are adjusted automatically as each team uploads statistics into the "standings/scoreboard" application. In some embodiments, team and individual player statistics are linked directly to fantasy league applications, such as the "Kids Fantasy League" described herein. For example, as an individual athlete's game statistics are uploaded into the system, their fantasy league standings and value change dynamically. This eliminates redundant data input and provides a seamless user experience among various applications.

In some embodiments, a variety of team standing views is available. For example, a team's record can be displayed as it relates to the team's win/loss percentage for home versus away games or how they perform against teams within their conference versus how they perform against teams playing outside their conference as well as the number of points scored for and against a given team.

In some embodiments, game results and standings are encapsulated into a data stream to be used as a newsfeed for a league website, individual team page, or fantasy league team page or website.

In some embodiments, the user has the ability to customize website links as described in "Content" herein, to point to the user's favorite teams. For example, a member of one team may be interested in how the member's friends are doing individually and as a team and want to create shortcuts to their individual game results and standings scoreboard.

Coach Tools

The sports management system provides tools for coaches. Some embodiments may include a system for designing, managing, and presenting "plays" or common sports strategies. Some embodiments may include user interfaces that present the players in a roster format. Some embodiments may include the ability to customize player rosters for day of game, scrimmage, multi-squad workouts, and other types of divisions of the team resources.

Some embodiments may include the ability to record, manage, store, and organize video of game and proactive footage. Some embodiments may include the ability to store scouting and competitive team data on opponents. Some embodiments may include the ability to record, organize, and manage video about opponents. Some embodiments may include the ability to record statistics and other reports about opponents.

Some embodiments may include access to training information, tips, and content. Some embodiments may include training and drills recommendations from a variety of outside sources. Some embodiments may include a rating system for different training tips, allowing coaches to determine the general credibility of a particular piece of advice. Some embodiments may include the ability for coaches to upload their own tips to share with other coaches. Some embodiments may include security measures to ensure that opponents are not able to see the training information shared by a coach. Some embodiments may include the ability to purchase packages of training content. Some embodiments may include practice routines, team drills, skills drills, and/or workout/strength training routines. Some embodiments may include evaluation systems and try-out evaluations.

Events

The sports management system provides tools to assist community users in locating athletic event fields and facilities. Since there are several existing technologies for locating specific geographic points, for example Google Maps and Apple iPhone maps, one embodiment allows users to use any mapping service that they prefer, but members of the community can easily create and download these maps from other external sources without significant effort. Some embodiments may provide pre-loaded fields and facilities for users to select from for creating maps to localities frequently used by their community. Some embodiments may provide points of interest (e.g., food, hospital, gas stations, hotels, sporting goods, and so on) located in proximity to a selected destination.

Some embodiments of the mapping service may appear on a PC screen, while some embodiments may utilize a mobile device. One embodiment utilizes a mobile device with a simple user interface that allows the selection of pre-loaded field/facilities to generate maps. Some embodiments create specific point-to-point directions from generated maps. Some embodiments generate audible turn-by-turn voice directions that can be used on a mobile device such as an Apple iPhone, for example, as well as, exported to an automobile's navigation system.

Some embodiments provide multiple views to generated maps, such as map and satellite views, as wells as a combination of both. Some embodiments may include traffic flow overlays along the selected route. Some embodiments may include integrated traffic camera views along the selected route. Some embodiments may provide current weather conditions and forecasts relevant to the selected field/facility location. Some embodiments may include pinpoints with pop-ups providing additional information as well as street-level photographs of the selected destination.

Some embodiments may interact with a field scheduling system like "league team season and field scheduling," previously described, in combination with a social network system like "Social Network", described later in this document, to show friends, relatives, and fans playing in nearby fields or facilities within a popup window.

The sports management system provides the ability to notify team members and parents of field location and scheduling changes and with assurance the change message is received by everyone affected. In the majority of organized sporting communities, a scheduling change or event cancellation/postponement is inevitable. Many times a coach, team manager, or simply the first person at the event is enlisted to begin notifying the rest of the team that a change has occurred. This should be done very rapidly with a reasonable expectation that the intended audience receives the message. One obstacle to ensuring everyone receives the message in a timely manner is lack of multiple contact methods (e.g., day phone, night phone, mobile phone, mobile device, and so on). Some embodiments may include a phone tree whereby a representative of the team is made aware of the change and commences calling each contact on the phone tree. Some embodiments may broadcast group email messages to those team members that have provided email addresses. One embodiment uses multiple communication channels in combination. For example, the system may utilize email, text messaging, and voice calling to notify each team member. In some embodiments, a PC-based web application interface may be used to provide multi-channel communication to list members.

In some embodiments, a mobile device with a simple, easy to use user interface is utilized for notification. The user interface employs roller or dropdown controls listing predetermined field locations and graphic buttons for representing application widgets to access additional mobile device functionality. The application widgets can include but are not limited to calendaring controls that allow for alternate date and time selections, voice message recording, weather updates, and broadcast notification. In some embodiments, the weather forecast application enhancement is represented be a colorful, iconic button symbolizing weather. When this button is clicked the application calls, via the API, an integrated weather application such as "weather" in the case of the Apple iPhone, to provide localized weather conditions/forecasts. In some embodiments, a colorful, iconic, time/location button can be used to call integrated calendaring functionality, such as "calendar" in the case of the Apple iPhone, to provide enhanced scheduling capabilities. In some embodiments, an additional application call to an integrated field location application such as described above under "Directions/Field Locator/weather/Services" is also invoked. In some embodiments, a colorful, iconic button representing voice recording/voice messaging invokes integrated recording functionality, such as "Voice Memos" in the case of the Apple iPhone, to record an audio explanation of the schedule change.

In some embodiments, the user interface provides a control to allow the user to send multiple forms of notification (email, text messaging, and voice messaging) simultaneously. For example, the user interface may provide a colorful, iconic button subtitled "Notify" that, when clicked, sends out schedule/field location updates to a pre-populated members list and updates prearranged schedules created using integrated applications such as "Scheduling" and "Car Pool" described herein. List members receiving update notifications will have previously provided their preferred channel of communication (e.g., email, text messaging, or voicemail) when registering for league/organization play utilizing a registration application such as describe above under "Registration."

Car Pooling

The sports management system provides the ability for valid volunteer drivers to form carpools to facilitate the transportation of athletes to and from predetermined athletic events. Some embodiments rely on telephone communication between eligible drivers to coordinate athlete transportation. Some embodiments may include the use of PC-based email applications while some embodiments may utilize a mobile device email application to broadcast requests for transportation of the athletes. One embodiment utilizes a mobile device with a simple user interface that allows for visually creating carpools from a predetermined list of eligible athletes. Some embodiments utilize a graphical representation of the carpool driver's available vehicle. For example, the user interface may include a top-down graphical representation of a multi-seat vehicle such as a mini-van. In such embodiments, the driver's available vehicle has been predetermined based on information provided when utilizing the registration process described herein.

Some embodiments may use dropdown controls to provide a list of eligible riders for creating the carpool by selecting the rider individually from the dropdown control to build the carpool roster. One embodiment uses a simple user interface comprised of color-coded iconic symbols shaped like people to represent eligible carpool riders. For example, the iconic symbols may represent the players on a given team. When an iconic symbol is clicked, the name of the player that symbol represents is displayed on the mobile device screen. Some embodiments may utilize gestures. For example, the user interface may include a combination of the graphical representation of the mini-van in combination with the iconic symbols and gestures to build the carpool roster. In this example, the mini-van would be represented initially as a vacant vehicle. Available seats within the mini-van representation are indicated by seat outlines. Occupied seats within the mini-van representation are indicated by the iconic symbols overlaying the seat outlines. The mini-van is populated by clicking on one of the iconic symbols and a drag gesture is made across the screen to an available seat within the mini-van. After the iconic symbol is released, the seat over which the symbol was released is represented as occupied.

Some embodiments may include fast notification to the carpool driver that an available seat has been occupied. Some embodiments may use text messaging to notify the carpool driver that an available seat within their vehicle has been selected. Some embodiments may include the name and location of the carpool rider as part of the standard notification message to the carpool driver. Some embodiments may include mapping capabilities that provide a desirable route for pickup and delivery of carpool riders based on rider addresses and event location.

Some embodiments may include the availability of the carpool driver to either accept or reject the rider requesting a ride. For example, when a driver receives a notification that a seat has been occupied, the driver's mobile device will indicate the requested seat by indicating the seat as occupied and applying a stroke to the outside of the rider icon. The driver can then click on the new icon and click on an accept or reject button control to finalize the request. Some embodiments include status notifications to the requesting rider when a ride request is either accepted or rejected.

Some embodiments may include the ability of the carpool driver to send out messages to all eligible riders that the carpool vehicle is full or that there are available seats for a given event. For example, the driver's mobile device user interface may provide buttons to indicate whether the vehicle is full or empty. When either button is clicked, the application queries eligible riders that have not yet secured a seat and notifies them via each recipient's preferred channel of communication about the status of the vehicle.

Some embodiments include using a mobile device to verbally notify parents or guardians of the rider that he/she has been picked up and delivered to the predetermined event. Some embodiments include the use of mobile device text messaging to notify parents or guardians that the rider has been picked up and delivered to the specified athletic event. One embodiment utilizes the GPS capabilities of a mobile device to automate the status of the carpool delivery process by simultaneously communicating the status of the rider's transportation through multiple communication channels.

For example, utilizing a mobile device's GPS capabilities and waypoint recognition functionality in combination with an automated voice/text messaging notification system, parents or guardians of the carpool riders are notified when specified waypoints are reached. Some embodiments may include an email reminder that is sent in addition to voice/text messaging capabilities. One embodiment may integrate all three communication channels with additional calendaring functionality based on email client application capabilities.

Some embodiments may integrate the vehicle seating availability with other aspects of the sports community, including but not limited to destination scheduling change notification systems like those described herein under "Scheduling" as well as roster management systems like that described herein.

Some embodiments may provide incentive programs for volunteer drivers such as the ability to earn loyalty points based on the number and frequency of carpool trips. Some embodiments may provide incentive programs for parents to earn loyalty points based on their ability to recruit additional parents to utilize the car pool application. For example, when a user requests an available seat or decides that a seat is not needed and notifies the carpool driver using the car pool application on their mobile device, a notification is sent to the car pool driver. This notification is tracked and associated with the instigating user. As the carpool driver enlists more parents to communicate through their mobile device, the driver earns additional loyalty points.

Be There Live

The sports management system provides the ability for parents, friends, and fans of an athlete to keep current on the progress of the game in the event they are unable to attend. In some embodiments, event tracking is available through integration with a PC and browser that are logged into a Web 2.0 web-based application. In some embodiments, event tracking includes the use of a mobile device capable of receiving SMS text messages as events occur. In some embodiments, the SMS text updates can be simultaneously uploaded to social network sites, such as Twitter or Facebook, to broadcast live event updates to the athlete's extended social network of family, friends, and fans. In some embodiments, event tracking involves the use of rich media mobile devices including but not limited to Apple iPhones or RIM Blackberries. Using rich media devices such as these enhances the user experience by providing a graphical user interface to the event tracking functionality. For example, a rich media device to track the progress of a baseball game can display a graphical representation of a baseball field. Players are represented by thumbnail photos arranged in position (offensive—at bat, on base, etc. or defensive—infield positions) and change position on the devices screen as they change on the field of play. The broadcast and recording of event details may use statistics input and tracking applications, such as "Stats Collector" described herein. As statistics are recorded at the field of play, they are quickly reflected on the mobile device or PC web-based application.

In some embodiments, the application includes an ability to present live photographs of the event. As event attendees upload photos via their mobile devices using applications such as "Photo Aggregator" described herein, these photos will be shown in pop-up windows as an overlay to the baseball field, for example. These photos can be presented as a slide show where as photos are uploaded they automatically scroll to give the mobile device or PC based user a live view of the event.

In some embodiments, the event is simultaneously broadcast live and recorded to provide for later on-demand viewing. For example, game events based on recorded statistics, photos and videos taken at the game, as well as audio commentary recorded during the event can be used to recreate the game timeline in a condensed format for creating and broadcasting a personalized highlight reel. In some embodiments, these highlight videos can be personalized for the athlete to create their own highlight reel for posting to the web and sharing with family, friends, and fans.

In some embodiments the "Be there live" record and broadcast functionality described herein can be incorporated into the "Kids Fantasy League" application described herein, to provide rich media interactivity for an enhanced fantasy league experience.

Socializing

The sports management system provides in-person social networking that takes place among parents, family members, and friends of young athletes and their teams. Being familiar enough with the team's family members and friends to remember names and recognize faces contributes to the enrichment of the community. With any social interaction there are occasions when the name of a familiar individual is not remembered, which can sometimes lead to an uncomfortable moment and less enriching experience. Since these social interactions are often conducted away from one's home or business, the need for a mobile reference source arises. Some embodiments utilize a mobile device as a source of reference that connects the child's team and all other team members with "mug shots" of parents, siblings, and fans based on current and previous team affiliations.

Some embodiments may include a democratic approach to collecting relevant information for each team member. Some embodiments may include the use of a PC to upload photo images to a centralized database. In some embodiments, users may be given the opportunity to utilize a PC and upload photo images of their child's friends and family and associate contact information including but not limited to first name, last name, and relationship to the relevant child into a centralized database. Loyalty points can be acquired by populating photos and contact information for those team members that have not already done so or are unable to. Additional loyalty points can be acquired by recruiting others to add their photos and information to the application thereby further increasing the viralization of the application.

Some embodiments incorporate the face recognition element with other aspects of the sports community, including but not limited to a car pool formation application like the one described previously, a roster management system like the one described above, as well as well as the "photo aggregator" application described below. Some embodiments may incorporate team contact lists, call trees, and integrated mapping applications to associate athlete, family, friends, and fans by geographic proximity.

Some embodiments provide images of family, friends, and fans for a single season. One embodiment may provide photo images of family, friends, and fans for the current year as well as previous years. For example, a child plays for his/her team this year, yet has been in the same league playing on many different teams with the same children for a few years. This child has established a relationship with previous teammates and in some embodiments, the association carries through in the ability to view photos from season to season. Some embodiments may limit the number of family, friends, and fans of any given athlete. One embodiment may provide for an unlimited number of family, friends, and fans to be associated with any given athlete.

Some embodiments may utilize a mobile device with a simple user interface utilizing rollers or drop-down controls to identify athletes by name. Some embodiments utilize a simple user interface, such as a roster listing each member as an active link, that, when clicked, presents the names and photos of immediate family members. One embodiment uses a mobile device incorporating user interface tools such as rollers and drop-down lists to select the year the athlete played for a given team. After the year has been selected, the device presents the team roster in a thumbnail format. For example, after a playing year and team have been selected using the scroller and drop-down control, a thumbnail gallery of team members is displayed on the mobile device. Each thumbnail (e.g., mug shot) is an active link that, when clicked, displays relevant information for the athlete, such as name, sport, team, and player number in addition to photos of immediate family members with names and relationships provided in text format next to each photo. In addition to immediate family members, the user may be given the option to view additional family, friends, and fans of the athlete by clicking on, for example, a "view fans" button. Clicking on the "view fans" button invokes the social network functionality, described herein, to allow the user to explore the "fan base" of a given athlete. In addition, in some embodiments, integration with established social-networking applications such as Facebook provides greater availability to gather associations to the athlete by incorporating friends and family not affiliated with the athlete's sports community.

In some embodiments, clicking on the "mug shot" image of a team member presents an option via a simple graphic button to create a virtual, printable contact card that can act as a replacement for the laminated contact card provided by the governing organization.

In some embodiments, loyalty points can be acquired by taking additional photos of team members, family, and friends. The more photos taken and uploaded the more loyalty points are earned.

Photo Aggregator

The sports management system provides the ability for players, fans, coaches, and other members of the community to upload and manage photos of the athletes. Since there are several systems available today for uploading and sharing of photos, one embodiment allows users to use any photo sharing service that they prefer, but members of the community can easily manage and organize these photos from external sources without significant effort.

One embodiment allows users to easily add links to photos on external online photo websites to their collection of photos on the sport community. In some embodiments, the user is not required to re-upload photos to the sport community, and instead is able to copy the link to the photo into a list of photo links, and the system will automatically store those links in the user's photo collection. In some embodiments, the photos themselves are imported into the system. In some embodiments, the photos remain on the external service, and only links to the photos are recorded. In some embodiments, those linked photos are presented as a single collection of photos, even in cases where the photos live on multiple independent external photo services. In some embodiments, users are able to request a printed scrapbook or photo album of all of the photos from multiple services.

Some embodiments may include support to easily tag photos. Some embodiments may include support for tagging location and time. Some embodiments may include automatic tagging of attributes. Some embodiments may include the ability to tag a photo with an athlete's name via clicking their picture from a roster. Some embodiments may include a Photo album view of athlete photos. Some embodiments may integrate photos with other aspects of the sports community like roster management, Be There Live, Never Forget a Face, and so on.

Some embodiments may include tools to organize the photos as if building a scrapbook of the athlete across time and across sports. Some embodiments may include notification (e.g., using RSS) to that athlete's fans of new photos. Some embodiments may provide access to services that allow the creation of gifts and physical objects with the photos printed on them. Some embodiments may involve partnerships with third parties (like Café Press) to turn photos into t-shirts, mugs, and so forth.

Some embodiments may include the option to upload photos directly to the sports community. Some embodiments may include the direct storage of photos within the system's infrastructure. Some embodiments may include integration with other external storage providers.

One feature of a sport community is the implementation of a social network for athletes, coaches, parents, fans, and other members of the community. One embodiment includes profile pages for athletes, coaches, and fans. One embodiment would include sections for teams, groups, organizing bodies, regions, sports, age groups, and other categorizations of athletes. One embodiment includes message boards, blogs, and other mechanisms to allow users to communicate with each other. One embodiment supports an athlete profile that transcends a particular team or season, allowing access across time, sport, and team.

Some embodiments may include easy video uploads to enable an "editor" to pull out and publicize the certain ones. Some embodiments may include a video resume of skills possessed by the athlete.

Some embodiments may support virtual trophies. Some embodiments may allow parents and grandparents to purchase virtual trophies to send to kids. Some embodiments may include virtual playing cards updated with real statistics from a statistics tracker application. Some embodiments may include virtual birthday/father's/mother's day greeting cards with their "play of the week". Some embodiments may provide the ability for athletes to challenge each other. Some embodiments may include an Inspirational story of the week or best sportsmanship example of the week—user generated via either print or video.

After a game, a family may connect to the system together to view game photos, videos, and statistics from the game. The child may, for example, send a "look at this great play" message to one of his friends while the parents send a game photo to the child's grandparents. When the coach connects to the system after the game, he is able to review the game statistics, which helps him decide what to work on at the next practice as well as giving him some new ideas for the next game line up. He can then send virtual trophies to various children on the team to reinforce the praise and coaching he used during the game.

Variations

In some embodiments, the sports management system interacts with mobile devices, such as the Apple iPhone, Research in Motion (RIM) Blackberry, smart phones running the Google Android operating system, and so forth to provide information to participants of the system while on the go. For example, the system may provide game schedules, scores, communication capabilities (e.g., text messaging or message boards), and so forth to participants' mobile devices. At the field, a coach may use a mobile version of a roster application to manage player rotation while parents may keep track of game statistics using a mobile statistics gathering application. When the game is over the coach can upload information with a single tap. The system may also generate revenue by charging an application fee for downloading a mobile application for accessing the system or ongoing usage fees for accessing the system.

In some embodiments, the sports management system provides avatars for players. The system may display avatars in association with communications from a player, such as email messages, posts to an online discussion forum, and so forth. The system may allow players to select an avatar that matches characteristics of the player. Children create avatars of themselves that are central to their experience and serve to unify aspects of the community. By clicking his/her child's avatar, a parent can order all of the child's sports gear for the season with the touch of a button—eliminating several trips to sporting goods stores. With a roster application, the coach can drag and drop each child's avatar into the child's assigned playing position, set the playing time rotation, and send information out to parents in advance of the game to set expectations.

In some embodiments, the sports management system receives user-generated content and applications. Players, coaches, and parents may provide content, such as photos, scores, and so on, related to sporting events (e.g., a game) or related activities (e.g., photos from an end-of-season party or trophy ceremony) that the system provides to other users of the system. The system also provides an application programming interface (API) through which third parties can extend the system to add additional functionality. These extensions may include user-generated software applications or plug-ins that the system displays in association with a website that provides a user interface to the system.

In some embodiments, the sports management system generates revenue through a subscription fee. The system may charge the subscription fee to teams, individual players, or based on other criteria. For example, the system may allow a particular player to engage with one team free and charge for additional teams with which the player is associated.

In some embodiments, the sports management system generates revenue through advertisements displayed in a user interface in association with information requested by users of the system. For example, the system may include banner ads or other website advertising, text message ads, and so on.

In some embodiments, the sports management system generates revenue through e-commerce related to sports teams. For example, the system may allow a team to order t-shirts or trophies customized for the team. The operator of the system may make a profit by obtaining such items at volume or discount prices and selling them to teams for retail prices.

In some embodiments, the sports management system awards loyalty points, analogous to frequent flyer miles, to reward behaviors the system operator wants to encourage among all the stakeholders (e.g., spreading the word and accelerating customer acquisition and site usage, reinforcing positive life lessons and encouraging healthy lifestyles, enhancing revenue growth, and so forth). The system allows loyalty points to be cashed in at various levels for sporting goods gifts (e.g., provided free to the system operator by major vendors as part of strategic partnering efforts) or other items.

From the foregoing, it will be appreciated that specific embodiments of the sports management system have been described herein for purposes of illustration, but that various modifications may be made without deviating from the spirit and scope of the invention. Accordingly, the invention is not limited except as by the appended claims.

We claim:

1. A computer-implemented method for accessing information stored by a sports platform based on roles and relationships, the method comprising:
   receiving a request to access a user interface that displays information about one or more sports-related items;
   identifying a user associated with the received request;
   determining one or more user roles associated with the user, wherein a role defines an actor type of the user in a sports team and is selected from the group consisting of a parent, a player, a coach, a team manager, a fan, an administrator, and a guest and wherein the role automatically identifies information that the identified user can access based on the actor type;
   determining one or more user relationships with other objects associated with the requested user interface, wherein a relationship corresponds to a real-world relationship including parent and child, coach and player, and player and team;
   accessing information describing one or more users, roles, and relationships to which the requested user interface is restricted, wherein the combination of a user's determined roles and a user's determined relationships allows the system to automatically determine access rights that identify a customized view for the user without receiving access rights manually from the user or an administrator;
   retrieving information associated with the requested user interface that is accessible to the identified user based on the user's associated roles and relationships; and
   displaying the requested user interface including the information accessible to the identified user and preventing the display of information that is not allowed based on the identified user's determined roles and relationships,
   wherein the preceding steps are performed by at least one processor.

2. The method of claim 1 wherein receiving a request to access a user interface comprises receiving a request to access a web page associated with a sports activity.

3. The method of claim 1 wherein identifying the user comprises identifying a user that previously logged into a profile from a mobile device.

4. The method of claim 1 wherein determining one or more user roles comprises accessing a data model that associates multiple roles with each user to determine information to which the user is granted access.

5. The method of claim 1 wherein determining one or more relationships comprises determining whether the requesting user has any relationships that would permit access to the information provided by the requested user interface.

6. The method of claim 1 wherein accessing restriction information comprises accessing stored information associated with a web page for viewing team information that identifies the users that can view the team information.

7. The method of claim 1 wherein accessing restriction information comprises identifying roles or relationships that can view the information provided by the requested user interface.

8. The method of claim 1 wherein accessing restriction information comprises accessing information that does not specify a particular user and specifies access by one or more user roles or relationships.

9. The method of claim 1 wherein retrieving the information comprises displaying different amounts or types of information to different users depending on the determined roles and relationships.

10. A computer system for providing a sports communication and collaboration platform that allows parties associated with sports teams to interact, the system comprising:
    a processor and memory configured to execute software instructions embodied by the following components;
    a user interface component configured to provide one or more user interfaces through which users access the system, wherein the user interfaces include information accessible to an identified user and prevent the display of information that is not allowed based on the identified user's determined roles and relationships;
    a role management component configured to manage one or more user roles that describe a user's rights and responsibilities for using the system, wherein a role defines an actor type of the user in a sports team and is selected from the group consisting of a parent, a player, a coach, a team manager, a fan, an administrator, and a guest and wherein the role automatically identifies information that the identified user can access based on the actor type;
    a registration component configured to receive user information and associate one or more user roles with a user;
    a relationship management component configured to manage relationships between users and other system objects, wherein a relationship corresponds to a real-world relationship including parent and child, coach and player, and player and team;
    a data model store configured to store records for each of the objects, roles, and relationships associated with the system, wherein the combination of a user's determined roles and a user's determined relationships allows the system to automatically determine access rights that identify a customized view for the user without receiving access rights manually from the user or an administrator; and
    a security model component configured to manage access to objects based on roles and relationships.

11. The system of claim 10 wherein the user interface component is further configured to restrict information to which the system grants a user access depending on the user's role and/or relationship with an object associated with a user interface the user is attempting to access.

12. The system of claim 10 wherein the role management component is further configured to uses user roles to determine actions that a user can perform with respect to system objects.

13. The system of claim 10 wherein the registration component is further configured to include a user interface through which the user provides sign-up information including one or more teams with which the user is associated.

14. The system of claim 10 wherein the registration component is further configured to create one or more invitations for inviting new users to use the system.

15. The system of claim 10 wherein the relationship management component is further configured to allow each user to have multiple relationships with other objects in the system at the same time.

16. The system of claim 10 wherein the relationship management component is further configured to handle formation and expiration of relationship records as user interactions with other users and objects change.

17. The system of claim 10 wherein the security model component is further configured to determine, each time a user requests access to a particular user interface provided by the system, what information the user can access and what to display in the user interface based on one or more roles and relationships associated with the user.

18. The system of claim 10 further comprising a scheduling component configured to manage event schedules and notifications associated with teams.

19. The system of claim 10 further comprising a statistics component configured to manage player and team performance information.

20. A computer-readable storage medium comprising instructions for controlling a computer system to register a new user of a sports management platform, wherein the instructions, upon execution, cause a processor to perform actions comprising:

receiving information about a user registering to use the sports management platform;

creating a user record that establishes an object managed by the platform for representing the user;

identifying one or more roles to associate with the created user record, wherein a role defines an actor type of the user in a sports team and is selected from the group consisting of a parent, a player, a coach, a team manager, a fan, an administrator, and a guest and wherein each role corresponds to one or more rights of the user for using the platform based on the actor type;

associating the identified roles with the user record;

identifying one or more relationships associated with the identified user roles, wherein each relationship specifies another system object with which the user is related, and wherein a relationship corresponds to a real-world relationship, including parent and child, coach and player, and player and team;

associating the identified relationships with the user record; and storing the created user record, identified roles, and identified relationships in a data store, wherein the combination of a user's determined roles and a user's determined relationships allows the system to automatically determine access rights that identify a customized view for the user without receiving access rights manually from the user or an administrator.

* * * * *